(12) United States Patent
Venkatadri et al.

(10) Patent No.: US 12,487,110 B2
(45) Date of Patent: Dec. 2, 2025

(54) SENSOR MODULE (71) Applicant: ANALOG DEVICES, INC.

(72) Inventors: Vikram Venkatadri, Ayer, MA (US);
David Frank Bolognia, Charlestown, MA (US)

(73) Assignee: Analog Devices, Inc., Wilmington, MA (US)

( * ) Notice: Subject to any disclaimer, the term of this patent is extended or adjusted under 35 U.S.C. 154(b) by 290 days.

(21) Appl. No.: 18/247,987

(22) PCT Filed: Oct. 27, 2021

(86) PCT No.: PCT/US2021/056871
§ 371 (c)(1),
(2) Date: Apr. 5, 2023

(87) PCT Pub. No.: WO2022/093972
PCT Pub. Date: May 5, 2022

(65) Prior Publication Data
US 2023/0384137 A1    Nov. 30, 2023

Related U.S. Application Data

(60) Provisional application No. 63/108,127, filed on Oct. 30, 2020.

(51) Int. Cl.
*G01F 11/02* (2006.01)
*A61M 5/315* (2006.01)
*G01F 23/263* (2022.01)

(52) U.S. Cl.
CPC ....... *G01F 11/027* (2013.01); *A61M 5/31511* (2013.01); *G01F 23/263* (2013.01)

(58) Field of Classification Search
CPC .... G01F 23/26–268; G01F 11/02–088; A61M 5/178–349
See application file for complete search history.

(56) References Cited

U.S. PATENT DOCUMENTS

| 5,423,214 A | 6/1995 | Lee |
| 6,110,148 A * | 8/2000 | Brown .................. G01F 3/16 |
| | | 222/23 |

(Continued)

FOREIGN PATENT DOCUMENTS

| CN | 116368356 A | 6/2023 |
| EP | 1 762 258 A1 | 3/2007 |

(Continued)

OTHER PUBLICATIONS

International Search Report and Written Opinion for International Application No. PCT/US2021/056871, dated Feb. 16, 2022 in 8 pages.

(Continued)

*Primary Examiner* — Justin N Olamit
(74) *Attorney, Agent, or Firm* — Knobbe, Martens, Olson & Bear, LLP (57) ABSTRACT

A sensor module is disclosed. The sensor module can include a housing body that is disposed about a cavity that is sized and shaped to receive a container in which a substance is disposed in an operational configuration of the sensor module. The sensor module can include a first electrode that is coupled to or formed with the housing body. The first electrode is disposed at a first peripheral position on the housing body. The sensor module can include a second electrode that is coupled to or formed with the housing body. The second electrode is disposed at a second peripheral position on the housing body that is opposite the first peripheral position. The cavity is disposed between the first and second electrodes in the operational configuration of the housing body.

19 Claims, 7 Drawing Sheets

(56) References Cited

U.S. PATENT DOCUMENTS

| | | | |
|---|---|---|---|
| 7,821,411 B1 * | 10/2010 | Ward | G01F 23/266 |
| | | | 340/616 |
| 10,145,760 B2 | 12/2018 | Govari | |
| 2004/0173892 A1 | 9/2004 | Nakanishi | |
| 2014/0251025 A1 | 9/2014 | Rogers et al. | |
| 2018/0093042 A1 * | 4/2018 | Klemm | G01F 23/268 |
| 2019/0022322 A1 * | 1/2019 | Schabbach | A61M 5/1684 |
| 2019/0060577 A1 | 2/2019 | Vallis | |
| 2023/0042083 A1 * | 2/2023 | Dugas | A61M 5/168 |

FOREIGN PATENT DOCUMENTS

| | | |
|---|---|---|
| EP | 3 359 114 B1 | 12/2019 |
| EP | 2605815 B1 | 12/2019 |
| EP | 4237804 | 9/2023 |
| JP | S62-180715 | 8/1987 |
| JP | H05 180795 A | 7/1993 |
| JP | 2000/039479 A | 2/2000 |
| JP | 2007-322288 | 12/2007 |
| JP | 2010-529441 | 8/2010 |
| JP | 5 044336 B2 | 10/2012 |
| JP | 2015-512509 | 4/2015 |
| JP | 2015-532136 | 11/2015 |
| JP | 2018-511425 | 4/2018 |
| JP | 2018-521796 | 8/2018 |
| WO | WO 2017/081051 | 5/2017 |
| WO | WO 2019/129620 A1 | 7/2019 |
| WO | WO-2021183704 A2 * | 9/2021 ............ A61M 5/168 |
| WO | WO 2022/093972 | 5/2022 |

OTHER PUBLICATIONS

Extended European Search Report for EP Application No. 21887451.9, dated Mar. 21, 2024 in 12 pages.

International Preliminary Report on Patentabiliity for International Application No. PCT/US2021/056871, dated May 2, 2023 in 6 pages.

* cited by examiner

SENSOR MODULE

CROSS-REFERENCE TO RELATED APPLICATIONS

This application claims priority to U.S. Provisional Patent Application No. 63/108,127, filed Oct. 30, 2020, which is related to U.S. Provisional Patent Application No. 62/988,014, filed on Mar. 11, 2020, the entire contents of which are incorporated by reference herein in their entirety and for all purposes.

BACKGROUND

Field

The field relates to a sensor module, and, in particular, to a sensor module for measuring a volume of a drug in a drug delivery device.

Description of the Related Art

In some automated drug delivery systems, a drive system automatically pushes a plunger of a syringe containing a drug to push the drug out of the syringe. Current methods for monitoring the amount of the drug that has been delivered and/or the amount of drug remaining in the syringe involve using an electro-mechanical gearing system to monitor the rotation of the drive shaft that pushes the plunger. This is an indirect measurement of the drug delivered, and it is subject to manufacturing issues and mechanical failures. For example, failures or breakdowns of the mechanical links between the motor, plunger rod, and stopper can affect measurements, as can shifts in motor rotations and gearing tolerances during manufacturing or after repeated usage of the delivery system.

SUMMARY

In one aspect, a sensor module is disclosed. The sensor module can include a housing body that is disposed about a cavity that is sized and shaped to receive a container in which a substance is disposed in an operational configuration of the sensor module. The sensor module can include a first electrode that is coupled to or formed with the housing body. The first electrode is disposed at a first peripheral position on the housing body. The sensor module can include a second electrode that is coupled to or formed with the housing body. The second electrode is disposed at a second peripheral position on the housing body that is opposite the first peripheral position. The cavity is disposed between the first and second electrodes in the operational configuration of the housing body.

In one embodiment, the first and second electrodes and the container form a capacitor. The sensor module can further include circuitry that is configured to measure a capacitance across the first and second electrodes. The measured capacitance can be correlated with an amount of the substance in the container.

In one embodiment the sensor module further include at least one substrate that is coupled to the housing body. The at least one substrate includes the first and second electrodes. The first and second electrodes can at least partially be embedded in an insulating material of the substrate.

The at least one substrate can include a single substrate.

The at least one substrate can be insert molded to an interior surface of the housing body such that the at least one substrate contacts and is mechanically attached to the interior surface.

The at least one substrate can include a first segment having the first electrode. The first segment can be bent or curved to be disposed about an outer surface of the container. The at least one substrate can include a second segment having the second electrode. The second segment can be bent or curved to be disposed about the outer surface of the container at a location opposite the first segment in the operational configuration of the sensor module.

The at least one substrate can include a plurality of patterned conductive layers that are at least partially embedded in the insulating material. The plurality of patterned conductive layers can include a first layer at a radially inner portion of the at least one substrate. The first layer can include the first and second electrodes.

The first layer can be exposed at a radially inner surface of the at least one substrate.

The plurality of patterned conductive layers can include a second layer that is disposed radially outward from the first layer. The second layer can include first and second driven shields disposed radially opposite one another.

The plurality of patterned conductive layers can include a third layer that is disposed radially outward from the second layer. The third layer can include first and second outer shields that are disposed radially opposite one another.

The at least one substrate can include a hinge segment that extends between the first and second segments. The hinge segment is rotatable between the operational configuration and a loading configuration of the sensor module in which the container can be loaded into or unloaded from the sensor module.

The housing body can include a first angled or curved section that is coupled to or formed with the first segment, a second angled or curved section that is coupled to or formed with the second segment, and a spring latch mechanism to connect the first and second sections. The spring latch mechanism can be biased to cause the first and second electrodes to contact the container in the operational configuration.

The insulating material can include a plurality of insulating layers.

In one embodiment, the sensor module further includes a transparent window in the housing body.

In one embodiment, at least one of the first and second electrodes spans an arc around the cavity having an angle less than 90°.

The arc around the cavity can have an angle in a range of 45° to 75°.

In one embodiment, the sensor module further includes the container. The container includes a vial or a syringe.

In one aspect, a sensor module is disclosed. The sensor module can include at least one substrate that has one or more conductive layers including first and second electrodes that are at least partially embedded in an insulating material. The at least one substrate includes a first segment that includes the first electrode. The first segment is bent or curved to be disposed about an outer surface of a container in which a substance is disposed. The at least one substrate includes a second segment that includes the second electrode. The second segment is bent or curved to be disposed about the outer surface of the container at a location opposite the first segment in an operational configuration of the sensor module. The at least one substrate includes a hinge segment that extends between the first and second segments.

The hinge segment is rotatable between the operational configuration and a loading configuration of the sensor module in which the container can be loaded into or unloaded from the sensor module.

In one embodiment, the sensor module further includes a housing body that is disposed about a cavity that is sized and shaped to receive the container. The at least one substrate can be coupled to the housing body.

The housing body can include a first angled or curved section that is coupled to or formed with the first segment, a second angled or curved section that is coupled to or formed with the second segment, and a spring latch mechanism to connect the first and second sections. The spring latch mechanism can be biased to cause the first and second electrodes to contact the container.

The at least one substrate can be insert molded to an interior surface of the housing body such that the at least one substrate contacts and is mechanically attached to the interior surface.

BRIEF DESCRIPTION OF THE DRAWINGS

Embodiments of this disclosure will now be described, by way of non-limiting example, with reference to the accompanying drawings.

DETAILED DESCRIPTION

Various embodiments disclosed herein relate to a sensor module that utilizes a capacitive sensor to measure an amount of a substance (e.g., a liquid such as a drug) in a container (e.g., a drug delivery device such as a vial or syringe). As explained in U.S. Provisional Patent Application No. 62/988,014, filed on Mar. 11, 2020, a capacitive sensor can directly measure the amount of a substance (e.g., a drug) within a drug delivery system.

Figure 1:
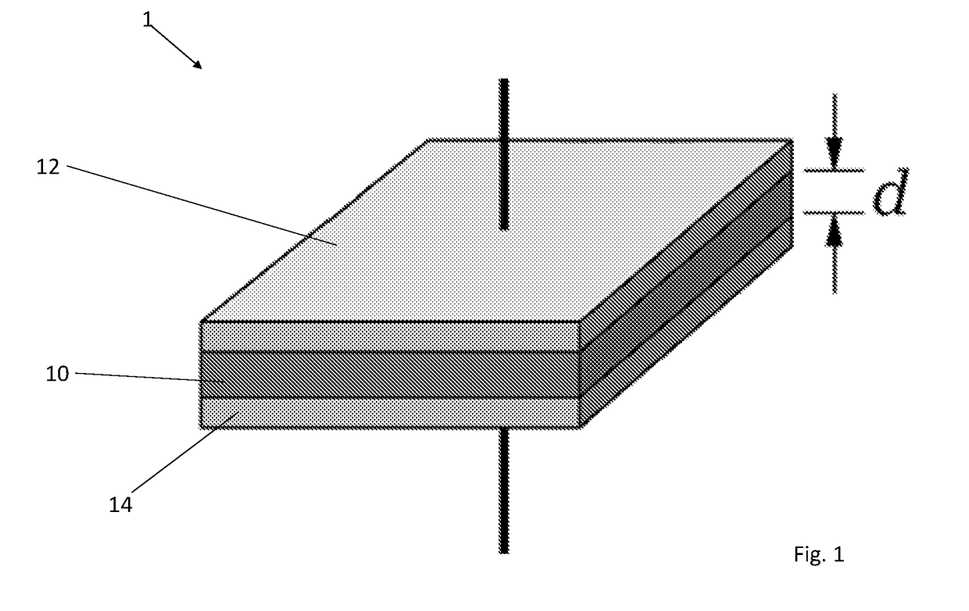
FIG. 1 illustrates a simplified schematic diagram showing a capacitive sensor.

FIG. 1 illustrates a simplified schematic diagram showing a capacitive sensor 1. The capacitive sensor 1 can include a dielectric material 10 disposed between a first conductive plate 12 and a second conductive plate 14 that are spaced by a distance d. The capacitance (C) varies linearly with the plate geometry of first and second conductive plate 12, 14, and the capacitance (C) of the capacitive sensor having the structure shown in FIG. 1 is calculated by Equation 1.

$$C = \varepsilon_0 * \varepsilon_r * A/d \quad \text{(Equation 1)}$$

In Equation 1, $\varepsilon_0$ is the permittivity of free space $(8.854*10^{-12}\ Fm^{-1})$; $\varepsilon_0$ is the relative static permittivity; A is the area of overlap of the first plate 12 and the second plate 14; and d is the distance between the first plate 12 and the second plate 14. In a multilayer dielectric material that includes three more plates with two or more dielectric layers, a series capacitor can be formed. The capacitance (C) of such series capacitor can be calculated by Equation 2.

$$C_{series} = (1/C_1) + (1/C_2) \ldots (1/C_n) \quad \text{(Equation 2)}$$

Figure 2A:
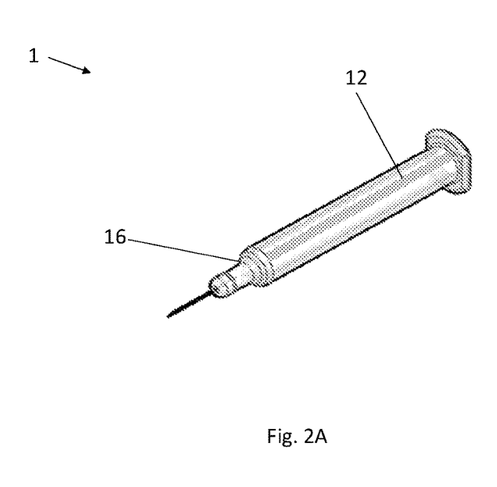
FIG. 2A is a schematic perspective view of an example capacitive sensor.
Figure 2B:
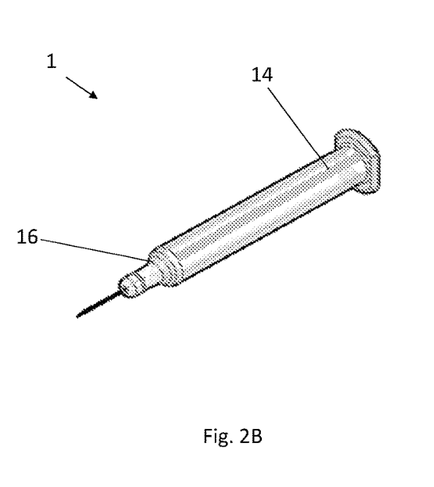
FIG. 2B is a schematic perspective view of the capacitive sensor as seen from an opposite side relative to a side shown in FIG. 2A.
Figure 2C:
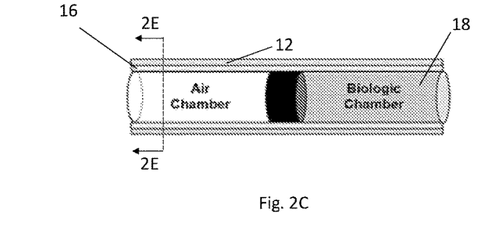
FIG. 2C is a side view of a portion of the capacitive sensor of FIGS. 2A and 2B.
Figure 2D:
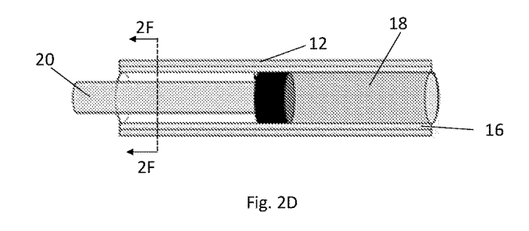
FIG. 2D is a cross sectional side view of a portion of the capacitive sensor of FIGS. 2A and 2B with a plunger rod.
Figure 2E:
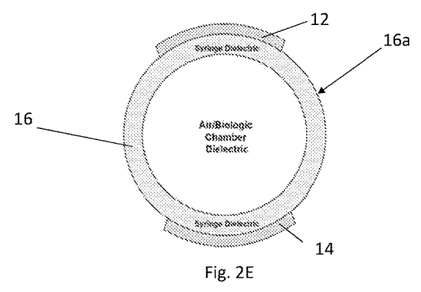
FIG. 2E is a cross sectional side view of the portion of the capacitive sensor shown in FIG. 2C.
Figure 2F:
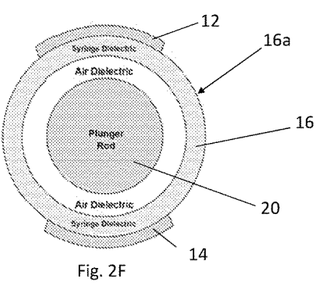
FIG. 2F is a cross sectional side view of the portion of the capacitive sensor shown in FIG. 2D.

FIG. 2A is a schematic perspective view of an example capacitive sensor 2. FIG. 2B is a schematic perspective view of the capacitive sensor 2 as seen from an opposite side relative to a side shown in FIG. 2A. FIG. 2C is a side view of a portion of the capacitive sensor 2 of FIGS. 2A and 2B. FIG. 2D is a cross sectional side view of a portion of the capacitive sensor 2 of FIGS. 2A and 2B with a plunger rod. FIG. 2E is a cross sectional side view of the portion of the capacitive sensor 2 shown in FIG. 2C. FIG. 2F is a cross sectional side view of the portion of the capacitive sensor 2 shown in FIG. 2D.

The capacitive sensor 2 can include two electrodes (a first electrode 12 and a second electrode 14) positioned along a container 16 (such as a vial or syringe) that is used to deliver a substance 18 such as a drug. A portion of the container 16 is being transparent to show internal components of the capacitive sensor 2 in FIGS. 2C and 2D. For example, the electrodes 12, 14 can extend lengthwise along an outer surface 16a (e.g., an outer wall) of the container 16 and can be positioned along opposite sides of the container 16, forming a capacitor around the container 16. The capacitance between the two electrodes 12, 14 varies based on the amount of the substance 18 (drug) remaining in the container 16, so the capacitance measurement directly correlates to the amount of the drug remaining. Conforming electrode shields prevent or eliminate external interference from noise sources in proximity to the capacitive sensor 2. The two electrodes 12, 14 can create an electric field within the container 16 (e.g., vial or syringe). The syringe, and the contents of the container 16, can serve as the dielectric between the electrodes 12, 14. For example, when the container 16 does not include the substance 18, air can be in the container 16. The substance 18 can be pushed out from the container 16 by way of a plunger rod 20. Circuitry can be connected to the capacitive sensor 2 to measure the amount (e.g., volume or mass) of the substance 18 in the container 16.

Figure 3:
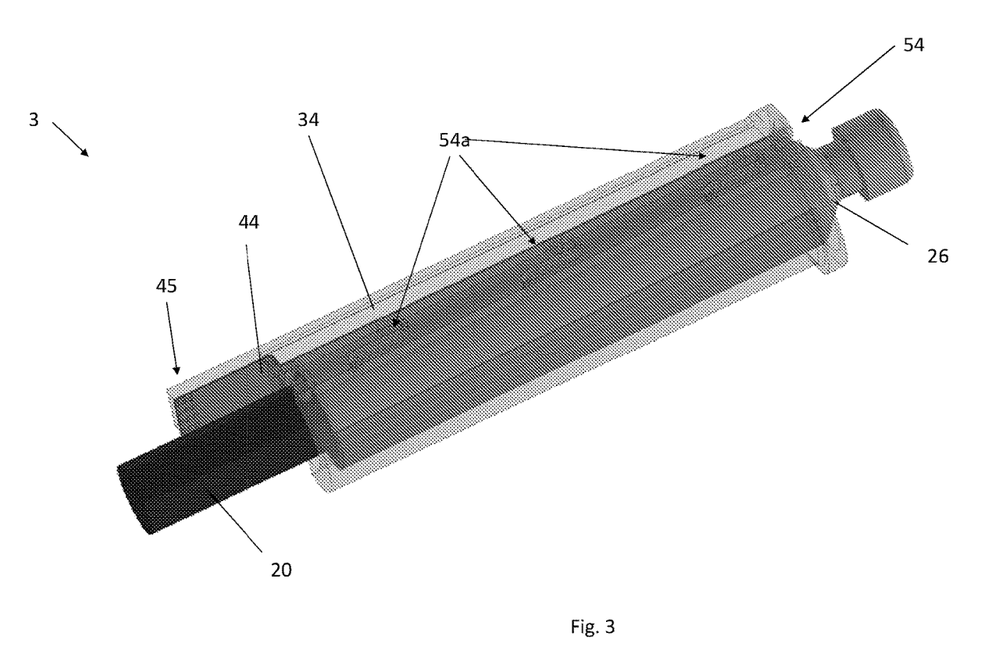
FIG. 3 is a schematic perspective view of a sensor module according to an embodiment.
Figure 4A:
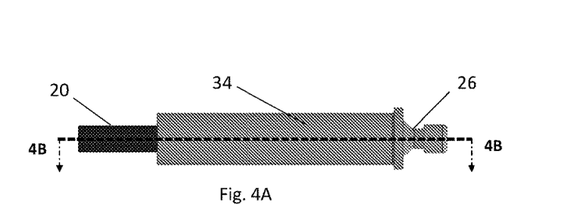
FIG. 4A is a schematic top plan view of the sensor module of FIG. 3.
Figure 4B:
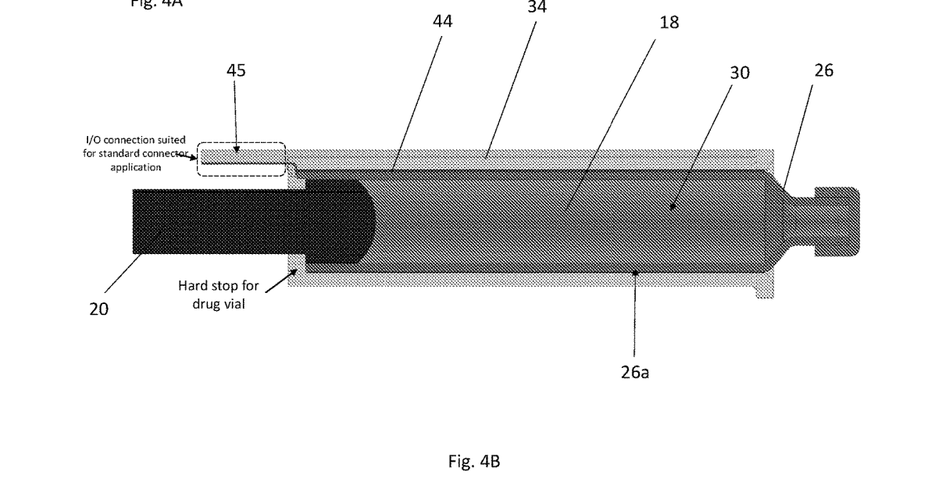
FIG. 4B is a schematic cross sectional side view of the sensor module of FIG. 3.
Figure 5A:
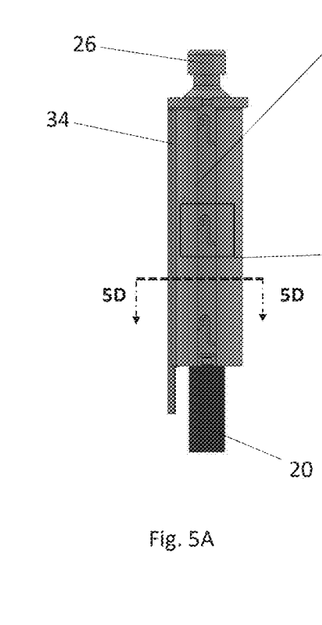
FIG. 5A is a schematic side plan view of the sensor module of FIG. 3.
Figures 5B, 5C, 5D:
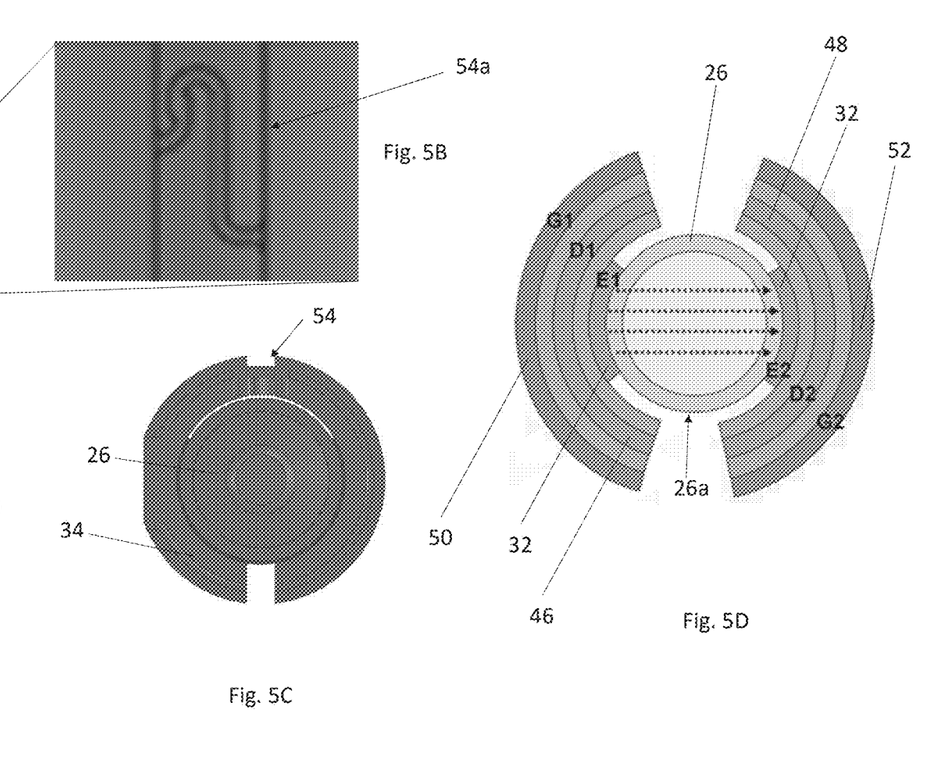
FIG. 5B is an enlarged view of a portion of the sensor module shown in FIG. 5A.
FIG. 5C is a plan view of the sensor module 3 as seen from one end of the sensor module of FIG. 3.
FIG. 5D is a schematic cross sectional side view of the sensor module of FIG. 3.

FIGS. 3 to 5C illustrate various views of a capacitive sensor module 3 according to an embodiment. FIG. 3 is a schematic perspective view of the sensor module 3. FIG. 4A is a schematic top plan view of the sensor module 3. FIG. 4B is a schematic cross sectional side view of the sensor module 3. FIG. 5A is a schematic side plan view of the sensor module 3. FIG. 5B is an enlarged view of a portion of the sensor module shown in FIG. 5A. FIG. 5C is a plan view of the sensor module 3 as seen from one end of the sensor module 3. FIG. 5D is a schematic cross sectional side view of the sensor module 3 without a housing body 34. FIGS. 6A to 6D illustrate various steps in a manufacturing process of manufacturing the sensor module 3.

The capacitive sensor module 3 can be configured to measure an amount of a substance 18 (e.g., a liquid such as a drug) in a container 26 (such as a vial or syringe). As shown, the sensor module 3 can comprise a housing body 34 disposed about a cavity 30 sized and shaped to receive the container 26 in which the substance 18 is disposed in an operational configuration of the sensor module 3. When the sensor module 3 is not in the operational configuration, the substance 18 may not be disposed in the container 26, and the container 26 can be empty (e.g., filled with air). The substance 18 can be pushed out from the container 16 by way of a plunger rod 20. A first electrode 32 can be coupled to or formed with the housing body 34. The first electrode 32 can be disposed at a first peripheral (e.g., circumferential) position 36 on the housing body 34. A second electrode 38 can be coupled to or formed with the housing body 34. The second electrode 38 can be disposed at a second peripheral (e.g., circumferential) position 40 on the housing body 34 that is opposite the first peripheral position 36. At least one of the first and second electrodes 32, 38 can span an arc around the cavity 30 having an angle less than 90°. The arc around the cavity 30 can have an angle in a range of 45° to 75°.

The cavity 30 (and the container 26) can be disposed between the first and second electrodes 32, 38 in the operational configuration of the housing body 34. In the operational configuration, the container 26 can be disposed and secured in the cavity 30, and the first and second electrodes 32, 38 and the container 26 can form a capacitor. The sensor module 3 can further include circuitry (not shown) configured to measure a capacitance across the first and second electrodes. The measured capacitance can be correlated with an amount of the substance 18 in the container 26.

The sensor module 3 can include at least one substrate 44 coupled to the housing body 34. The substrate 44 can comprise a package substrate, such as a flexible package substrate that has conductive layer(s) at least partially embedded in an insulating material (see FIG. 5D). In the illustrated embodiment, the at least one substrate comprises only a single substrate having a plurality of patterned segments. In other embodiments, the at least one substrate can comprise a plurality of substrates connected together. The at least one substrate 44 can include the first and second electrodes 32, 38, which can be at least partially embedded in an insulating material of the substrate 44. In some embodiments, the at least one substrate 44 can comprise a connector portion 45. The connector portion 45 can comprise a plurality of contacts configured to provide electrical communication between the sensor module 3 and an external device or substrate. For example, the plurality of contacts can include input/output contacts.

The at least one substrate 44 can be insert molded to an interior surface 35 of the housing body 34, which can comprise a polymer or plastic such as acrylonitrile butadiene styrene (ABS). The resulting molded structure can be formed such that the at least one substrate 44 contacts and is mechanically attached to the interior surface 35 of the housing body 34. In the illustrated embodiment, the at least one substrate 44 can include a first segment 44a comprising the first electrode 32 and a second segment 44b comprising the second electrode 38. The first segment 44a can be bent or curved to be disposed about an outer surface 26a of the container 26. The second segment 44b can be bent or curved to be disposed about the outer surface 26a of the container 26 at a location opposite the first segment 44a in the operational configuration of the sensor module 3. In the illustrated embodiment, the first and second segments 44a, 44b of the substrate 44 can be deformed into a curved profile that is approximately circular. In other embodiments, the curved profile can be elliptical or otherwise include curved sections. In still other embodiments, for example, in embodiments in which the container 26 is polygonal in cross-section (e.g., rectangular, etc.), the first and second segments 44a, 44b can be bent to conform to the angled outer surface 26a of the container 26. In the illustrated embodiment, the substrate 44 can comprise a flexible substrate that includes one or more conductors at least partially embedded in an insulating material.

Referring to FIG. 5D, the at least one substrate 44 can comprise a plurality of patterned conductive layers at least partially embedded in the insulating material. The insulating material can comprise one insulating layer or a plurality of insulating layers. The plurality of patterned conductive layers can include a first layer at a radially inner portion of the at least one substrate. The first layer can include the first and second electrodes 32, 38. In some embodiments, the first layer can be exposed at a radially inner surface of the at least one substrate 44, and can be configured to directly contact the outer surface 26a of the container 26. The plurality of patterned conductive layers can further include a second layer disposed radially outward from the first layer. The second layer can include first and second driven shields 46, 48 disposed radially opposite one another. The plurality of patterned conductive layers can include a third layer disposed radially outward from the second layer. The third layer can comprise first and second outer shields 50, 52 disposed radially opposite one another.

Figures 6A, 6B, 6C:
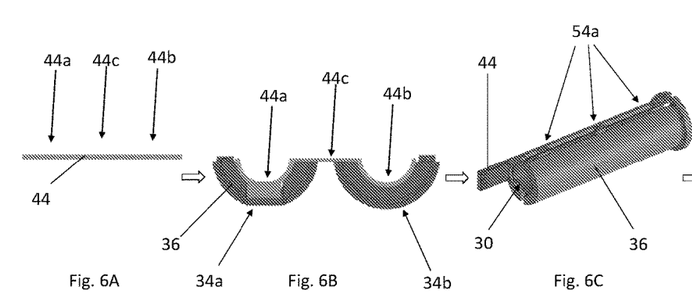
FIG. 6A illustrates a step in a manufacturing process of manufacturing the sensor module of FIG. 3.
FIG. 6B illustrates another step in the manufacturing process.
FIG. 6C illustrates another step in the manufacturing process.

As shown in FIG. 6B, the at least one substrate 44 can include a hinge segment 44c extending between the first and second segments 44a, 44b. The hinge segment 44c can be rotatable between the operational configuration and a loading configuration of the sensor module 3 in which the container 26 can be loaded into or unloaded from the sensor module 3. The housing body 34 can include a first angled or curved section 34a coupled to or formed with the first segment 44a, and a second angled or curved section 34b coupled to or formed with the second segment 44b.

A spring latch mechanism 54 can removably connect the first and second sections 34a, 34b of the housing body 34. As shown, for example, in FIG. 5B, the spring latch mechanism 54 can be disposed peripherally (e.g., circumferentially) opposite to the hinge segment 44c. The spring latch mechanism 54 can serve as a latch to removably couple the first and second sections 34a, 34b of the housing body 34 to secure the container 26 within the cavity 30 in the operational configuration. The spring latch mechanism 54 can be biased to cause the first and second electrodes 32, 38 to contact the container 26 in the operational configuration. In some embodiments, the spring latch mechanism 54 can be radially biased. In some embodiments, the spring latch mechanism 54 can alternatively or additionally be circumferentially biased. Other types of spring mechanisms can be used to provide compliance in the housing body 34 and to secure the electrodes 32, 38 against the container 26 in the operational configuration.

The spring latch mechanism 54 can comprise one or a plurality of latches 54a (e.g., two, three, or more latches) formed in or with the housing body 34. The latches 54a can comprise a projection that extends from and that can be formed with the housing body 34. The latches 54a can comprise a serpentine shape or other profile that provides spring-like forces to tightly secure the housing body 34 to the container 26 in the operational configuration. The first and second sections 34a, 34b of the housing body 34 can respectively include complementary-shaped portions of the latch 54a so that the complementary-shaped portions can cooperate to secure the first and second sections 34a, 34b together in the operational configuration. Beneficially, the latches 54a can be flexible so as to accommodate containers having varying diameters, but can exert a resilient spring force to press the first and second electrodes 32, 38 inwardly so that the first and second electrodes 32, 38 maintain contact with the outer wall 26a of the container 26 in the operational configuration, which can improve accuracy of capacitance measurements. The latches 54a can be spaced apart along a length of the housing body 34 to define a transparent window 68 in the housing body 34. The transparent window 68 can enable the user to view the substance 18 in the container 26. The latches 54a can be unlatched after use, to place the sensor module 3 in the loading configuration, and the container 26 can be removed from the sensor module 3. Another container may be loaded into housing body 34, or the container 26 can be re-filled with the substance 18, and the latches 54a can be re-latched for further measurements in the operational configuration.

In some embodiments, the manufacturing process of manufacturing the sensor module 3 can start with providing at least one substrate 44 as shown in FIG. 6A. The at least one substrate 44 can comprise a first segment 44a, a second segment 44b, and a hinge segment 44c. The at least one substrate 44 can comprise a flexible package substrate that has conductive layer(s) at least partially embedded in an insulating material.

At FIG. 6B, the at least one substrate 44 can be insert molded to an interior surface 35 of the housing body 34. The first segment 44a and the second segment 44b of the at least one substrate 44 can be disposed on a first section 44a and a second section 34b of the housing body 34 respectively. The first section 44a and the second section 34b can be coupled through the hinge segment 44c. The at least one substrate 44 can at least partially conform to the shape of the housing body 34.

At FIG. 6C, the hinge segment 44c of the at least one substrate 44 can bend so as to bring the second section 34b over the first section 44a thereby defining a cavity 30 between the first and second sections 44a, 44b. A spring latch mechanism 54 can connect the first and second sections 34a, 34b of the housing body 34. The spring latch mechanism 54 can serve as a latch to removably couple the first and second sections 34a, 34b of the housing body 34.

Figure 6D:
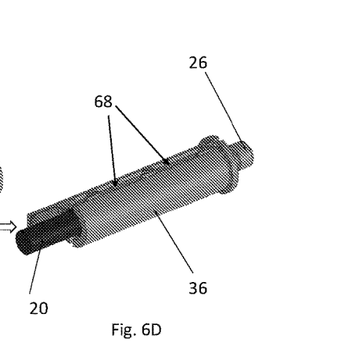
FIG. 6D illustrates another step in the manufacturing process.

At FIG. 6D, a container 26 (such as a vial or syringe) that includes a substance (e.g., a drug) therein can be provided. The cavity 30 at least partially define by the housing body 34 can receive the container 26 in an operational configuration of the sensor module 3. In some embodiments, the substance in the container 26 can be inspected through a window provided between the latches 54a of the spring latch mechanism 54.

Although disclosed in the context of certain embodiments and examples, it will be understood by those skilled in the art that the present invention extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the present disclosure. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the aspects that follow.

What we claim is:

1. A sensor module comprising:
    a housing body disposed about a cavity sized and shaped to receive a container in which a substance is disposed in an operational configuration of the sensor module;
    a first electrode coupled to or formed with the housing body, the first electrode disposed at a first peripheral position on the housing body;
    a second electrode coupled to or formed with the housing body, the second electrode disposed at a second peripheral position on the housing body that is opposite the first peripheral position, the cavity disposed between the first and second electrodes in the operational configuration of the housing body; and
    at least one substrate coupled to the housing body and comprising a plurality of conductive layers at least partially embedded in an insulating material of the substrate, the plurality of conductive layers including:
        a first layer at a radially inner portion of the at least one substrate,
        a second layer disposed radially outward from the first layer, and
        a third layer disposed radially outward from the second layer, the third layer comprising first and second outer shields disposed radially opposite one another.

2. The sensor module of claim 1, wherein the first and second electrodes and the container form a capacitor, the sensor module further comprising circuitry configured to measure a capacitance across the first and second electrodes, the measured capacitance correlated with an amount of the substance in the container.

3. The sensor module of claim 1, wherein the at least one substrate comprises the first and second electrodes, and wherein the first and second electrodes are at least partially embedded in the insulating material of the substrate.

4. The sensor module of claim 1, wherein the at least one substrate comprises a single substrate.

5. The sensor module of claim 1, wherein the at least one substrate is insert molded to an interior surface of the housing body such that the at least one substrate contacts and is mechanically attached to the interior surface.

6. The sensor module of claim 1, wherein the at least one substrate comprises:
    a first segment comprising the first electrode, the first segment being bent or curved to be disposed about an outer surface of the container; and a second segment comprising the second electrode, the second segment being bent or curved to be disposed about the outer surface of the container at a location opposite the first segment in the operational configuration of the sensor module.

7. The sensor module of claim 1, wherein at least one of the first layer, the second layer, or the third layer is a patterned conductive layer, and wherein the first layer includes the first and second electrodes.

8. The sensor module of claim 1, wherein the first layer is exposed at a radially inner surface of the at least one substrate.

9. The sensor module of claim 1, wherein, the second layer comprises first and second driven shields disposed radially opposite one another.

10. The sensor module of claim 6, wherein the at least one substrate comprises a hinge segment extending between the first and second segments, the hinge segment rotatable between the operational configuration and a loading configuration of the sensor module in which the container is loaded into or unloaded from the sensor module.

11. The sensor module of claim 6, wherein the housing body comprises a first angled or curved section coupled to or formed with the first segment, a second angled or curved section coupled to or formed with the second segment, and a spring latch mechanism to connect the first and second sections, the spring latch mechanism biased to cause the first and second electrodes to contact the container in the operational configuration.

12. The sensor module of claim 1, wherein the insulating material comprises a plurality of insulating layers.

13. The sensor module of claim 1, further comprising a transparent window in the housing body.

14. The sensor module of claim 1, wherein at least one of the first and second electrodes spans an arc around the cavity having an angle less than 90°.

15. The sensor module of claim 14, wherein the arc around the cavity has an angle in a range of 45° to 75°.

16. The sensor module of claim 1, further comprising the container, the container comprising a vial or a syringe.

17. A sensor module comprising:
at least one substrate comprising a plurality of conductive layers including first and second electrodes at least partially embedded in an insulating material, the at least one substrate comprising:
   a first segment comprising the first electrode, the first segment being bent or curved to be disposed about an outer surface of a container in which a substance is disposed;
   a second segment comprising the second electrode, the second segment being bent or curved to be disposed about the outer surface of the container at a location opposite the first segment in an operational configuration of the sensor module; and
   a hinge segment extending between the first and second segments, the hinge segment rotatable between the operational configuration and a loading configuration of the sensor module in which the container can be loaded into or unloaded from the sensor module;
wherein the plurality of conductive layers comprises:
   a first layer at a radially inner portion of the at least one substrate,
   a second layer disposed radially outward from the first layer, and
   a third layer disposed radially outward from the second layer, the third layer comprising first and second outer shields disposed radially opposite one another.

18. The sensor module of claim 17, further comprising a housing body disposed about a cavity sized and shaped to receive the container, the at least one substrate coupled to the housing body.

19. The sensor module of claim 18, wherein the housing body comprises a first angled or curved section coupled to or formed with the first segment, a second angled or curved section coupled to or formed with the second segment, and a spring latch mechanism to connect the first and second sections, the spring latch mechanism biased to cause the first and second electrodes to contact the container.

* * * * *